United States Patent
Hofmann et al.

(10) Patent No.: US 9,151,949 B2
(45) Date of Patent: Oct. 6, 2015

(54) DEFLECTION DEVICE FOR A PROJECTION APPARATUS, PROJECTION APPARATUS FOR PROJECTING AN IMAGE AND METHOD FOR CONTROLLING A DEFLECTION APPARATUS FOR A PROJECTION APPARATUS

(75) Inventors: Ulrich Hofmann, Itzehoe (DE); Lars Ratzmann, Tönning (DE); Joachim Janes, Itzehoe (DE); Manfred Weiss, Itzehoe (DE); Sascha Mühlmann, Itzehoe (DE)

(73) Assignee: Fraunhofer-Gesellschaft zur Förderung der angewandten Forschung e.V. (DE)

( * ) Notice: Subject to any disclaimer, the term of this patent is extended or adjusted under 35 U.S.C. 154(b) by 695 days.

(21) Appl. No.: 13/515,850

(22) PCT Filed: Dec. 13, 2010

(86) PCT No.: PCT/EP2010/007684
§ 371 (c)(1),
(2), (4) Date: Aug. 28, 2012

(87) PCT Pub. No.: WO2011/082789
PCT Pub. Date: Jul. 14, 2011

(65) Prior Publication Data
US 2012/0307211 A1     Dec. 6, 2012

(30) Foreign Application Priority Data
Dec. 14, 2009 (DE) .................. 10 2009 058 762

(51) Int. Cl.
*G02B 26/10* (2006.01)
*G09G 3/02* (2006.01)
*H04N 9/31* (2006.01)

(52) U.S. Cl.
CPC ............ *G02B 26/101* (2013.01); *H04N 9/3129* (2013.01); *G09G 3/02* (2013.01); *G09G 3/025* (2013.01); *H04N 9/3132* (2013.01); *H04N 9/3135* (2013.01)

(58) Field of Classification Search
CPC . G02B 26/101; H04N 9/3129; H04N 9/3132; H04N 9/3135; G09G 3/02; G09G 3/025
USPC ........................................ 353/98, 73, 50, 37
See application file for complete search history.

(56) References Cited

U.S. PATENT DOCUMENTS

| | | | |
|---|---|---|---|
| 6,245,590 B1 * | 6/2001 | Wine et al. ...................... 438/52 |
| 6,256,131 B1 * | 7/2001 | Wine et al. ................. 359/199.1 |
| 6,285,489 B1 * | 9/2001 | Helsel et al. ................... 359/291 |
| 6,331,909 B1 * | 12/2001 | Dunfield ...................... 359/199.1 |
| 6,445,362 B1 * | 9/2002 | Tegreene .......................... 345/7 |
| 6,795,221 B1 * | 9/2004 | Urey .......................... 359/199.1 |
| 6,843,568 B2 | 1/2005 | Schenk et al. |
| 7,098,871 B1 * | 8/2006 | Tegreene et al. ................... 345/7 |
| 7,580,007 B2 | 8/2009 | Brown et al. |
| 7,971,790 B2 * | 7/2011 | Hung et al. .................... 235/454 |
| 2002/0014579 A1 * | 2/2002 | Dunfield ....................... 250/216 |
| 2002/0020810 A1 * | 2/2002 | Wine et al. .................... 250/234 |
| 2002/0024708 A1 * | 2/2002 | Lewis et al. ................... 359/197 |
| 2002/0196226 A1 * | 12/2002 | Tegreene et al. .............. 345/103 |
| 2003/0133196 A1 * | 7/2003 | Wine et al. .................... 359/578 |
| 2003/0174382 A1 * | 9/2003 | Massieu ....................... 359/290 |
| 2004/0119004 A1 * | 6/2004 | Wine et al. .................... 250/234 |
| 2005/0139678 A1 * | 6/2005 | Helsel et al. ............. 235/462.37 |
| 2006/0117854 A1 | 6/2006 | Turner |
| 2006/0145945 A1 * | 7/2006 | Lewis et al. ....................... 345/7 |
| 2008/0291597 A1 * | 11/2008 | Seibel et al. .................. 361/241 |
| 2009/0059179 A1 | 3/2009 | Kobori et al. |
| 2009/0092364 A1 * | 4/2009 | Johnston et al. .............. 385/117 |
| 2009/0185251 A1 * | 7/2009 | Chen et al. ................. 359/199.3 |
| 2009/0316116 A1 * | 12/2009 | Melville et al. ................. 353/31 |
| 2010/0277782 A1 | 11/2010 | Quenzer |

FOREIGN PATENT DOCUMENTS

| | | |
|---|---|---|
| DE | 102004060576 A1 | 7/2006 |
| DE | 102007032801 A1 | 1/2009 |
| DE | 102008008565 A1 | 8/2009 |
| EP | 1419411 B1 | 1/2005 |
| GB | 2457155 A | 8/2009 |
| WO | WO-2006063577 A1 | 6/2006 |

OTHER PUBLICATIONS

"International Application Serial No. PCT/EP2010/007684, International Search Report mailed Jun. 20, 2011", (w/ Engiish Translation), 7 pgs.

"International Application Serial No. PCT/EP2010/007684, Written Opinion mailed Jun. 20, 2011", 7 pgs.

Hofmann, Ulrich, et al., "Wafer-level vacuum packaged micro-scanning mirrors for compact laser projection displays", MOEMS and Miniaturized Systems VII, edited by David L. Dickensheets, Harald Schenk, Proc. of SPIE, vol. 6887, 688706-1 (2008); downloaded from SPIE Digital Library on Oct. 8, 2010, (2008), 15 pgs.

Oldsen, Marten, et al., "Waferlevel Vacuum Packaged Microscanners: A High Yield Fabrication Process for Mobile Applications", Journal Integrated Circuits and Systems 2009, vol. 4, No. 2, (2009), 73-78.

\* cited by examiner

*Primary Examiner* — Bao-Luan Le (74) *Attorney, Agent, or Firm* — Schwegman Lundberg & Woessner, P.A.

(57) ABSTRACT

The invention relates to a deflection device for a projection apparatus for projecting Lissajous figures onto an observation field which is made to deflect a light beam about at least one first and one second deflection axis for generating Lissajous figures having a deflection unit for producing oscillations about the deflection axes and having a control apparatus for producing control signals for the deflection unit having a first and second control frequency which substantially corresponds to the resonant frequencies of the deflection unit, wherein the deflection unit has a quality factor of >3,000 and the control apparatus includes a feedback loop which is configured to regulate the first and/or second control frequencies in dependence on a measured phasing of the oscillations of the deflection unit so that the maximum amplitude of the oscillations remains in the resonant range of the deflection unit. The invention further relates to a projection apparatus having such a deflection device as well as to a method for controlling a corresponding deflection device.

22 Claims, 6 Drawing Sheets

DEFLECTION DEVICE FOR A PROJECTION APPARATUS, PROJECTION APPARATUS FOR PROJECTING AN IMAGE AND METHOD FOR CONTROLLING A DEFLECTION APPARATUS FOR A PROJECTION APPARATUS

PRIORITY CLAIM TO RELATED APPLICATIONS

This application is a national stage application under 35 §371 of PCT/EP2010/007684, filed Dec. 13, 2010, and published as WO 2011/082789 A1 on Jul. 14, 2011, which claims priority to German Application No. 10 2009 058 762.4, filed Dec. 14, 2009, which applications and publication are incorporated by reference as if reproduced herein and made a part hereof in their entirety, and the benefit of priority of each of which is claimed herein.

The invention relates to a deflection device for a projection apparatus, to a projection apparatus for projecting an image onto an image field and to a method for controlling a deflection device.

So-called Lissajous projectors are known in the prior art in which mirrors are used which oscillate resonantly or almost resonantly in two axes and thus oscillate in a sinusoidal manner. Inherent to their functional principle, these mirrors, also called resonant scanners, are able to achieve much larger amplitudes than non-resonantly operated scanners. Relating to a scanning laser projection, larger amplitudes are equivalent to a higher optical resolution. For this reason, the Lissajous projection is of great interest for compact laser projectors, even if it has an inhomogeneous illumination in both axes.

A projection apparatus is known from EP 1 419 411 B1 in which the two scanning or control frequencies of the two deflection or scanning axes differ by less than one order of magnitude, that is, f1/f2<10. The deflection or scanning system used for this purpose in this respect includes means to fix the scanning frequencies in each axis to the frequencies f1 or f2. It is thus ensured that a closed fixed-position Lissajous figure results which repeats periodically. Further fr=f1/n=f2/m applies to the Lissajous repetition frequency, where n and m are integer numbers. This known prior art proposes fixed frequencies for realizing the image projection. Suitable means for frequency stabilizing must thus be provided so that a fixed rational number frequency ratio f1:f2=n:m is permanently present.

DE 10 2008 008 565 also discloses a Lissajous projection process having two fixed frequencies whose largest common divisor forms the repetition rate of the Lissajous figure.

Patent specification U.S. Pat. No. 7,580,007 B2 likewise proposes a Lissajous projection process using fixed frequencies f1 and f2 in which the Lissajous trajectory repeats after an integer number of horizontal oscillations.

The problem occurs with the described Lissajous projection processes or projection apparatus, which are based. Ott the fact that the two scanning frequencies f1 and f2 of the axes of the deflection unit or of the MEMS scanner operated in resonance or close to resonance are constant in time, that the oscillation amplitude also has to be kept constant in time even if the resonant frequency of the resonant mechanical oscillation system or systems, also called mechanical oscillators, changes due to external influences such as an abrupt temperature change, e.g. clue to a modified laser power. So that the amplitude change accompanying the change in the resonant frequency remains small, a wide resonant curve, equivalent to a low quality factor, is a requirement.

Figure 1:
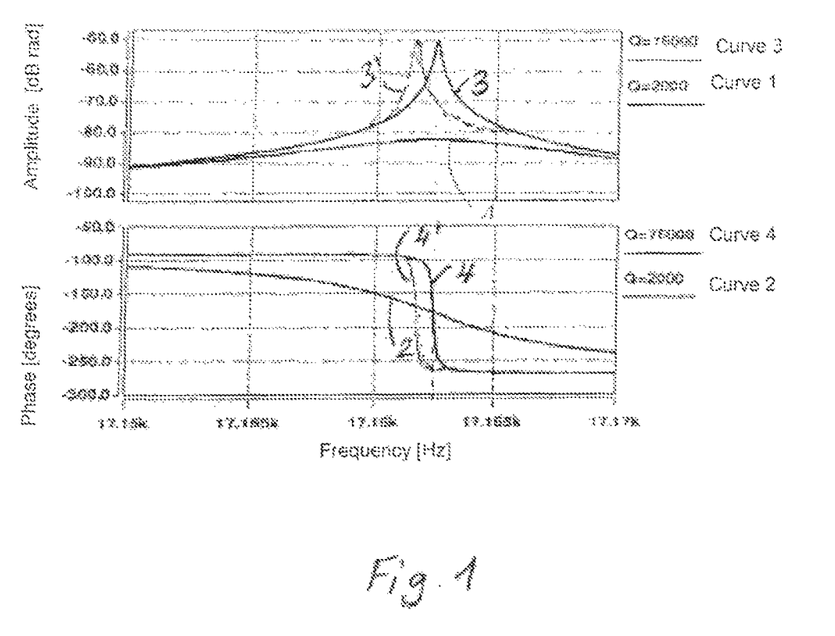
FIG. 1 the amplitude responses and phase responses of a highly damped resonant scanner of low quality in accordance with the prior art and the amplitude responses and phase responses for a scanner of similar construction, that ism of a deflection unit on an MEMS base of high quality.

An amplitude response and a phase response over the frequency are shown in FIG. 1, with 1 showing a damped resonant scanner or a damped deflection unit of low quality having a quality factor of Q=2,000 and 2 the corresponding phase. In this respect, the quality factor Q is defined as the ratio of the resonant frequency to bandwidth and the bandwidth is defined as the width of the resonant peak at the point at which the damping reaches 3.01 dB. The projection apparatus described in the prior art are now used in combination with those highly damped deflection units in which the resonant curve is so shallow that on a change in the resonant frequency, for example due to temperature changes or the like, only a very small amplitude change and phase change occur which can under certain circumstances be compensated fast enough by increasing the drive energy. This means that the known deflection units which have a low quality factor have a good amplitude stability, a good phase stability and also a wide frequency tunability. However, these known deflection units also have quite distinct disadvantages. The high damping generally requires a substantially higher energy consumption, which is in particular a disadvantage for mobile use such as in a cellular phone. The amplitudes achievable with the customary forces available in microtechnology are furthermore limited.

Not only extremely fast deflection units or resonators with deflection frequencies >32 kHz are required for the projection of very high resolution images, such as with HDTV resolution, but also very large optical deflection angles. The so-called theta D product is given as the parameter which is defined from the product of the diameter D of the deflection element, e.g. of a mirror plate and a one-side mechanical scanning amplitude or deflection amplitude theta, respectively mechanical half-angle. The required theta D product for HDTV resolution must be larger than 24 degrees*mm, e.g. at D=1.5 mm and theta >16 degrees, with this corresponding to a total optical scanning angle or deflection angle of >64 degrees. These set values have previously not been achievable using the highly damped MEMS deflection units known in the prior art.

It is the underlying object of the invention to provide a deflection device which allows, a high scanning and deflection frequency and equally provides a high theta D product.

This object is achieved, albeit only partially (will be explained in the following), by a deflection device having a high-quality deflection unit.

In FIG. 1, the amplitude response of a scanner with little damping or of a deflection unit with little damping and the associated phase response 4 are shown, with it being able to be recognized that the amplitude characteristic 3 has a high resonant increase and the phase characteristic 4 has a steep fall, i.e. a steep gradient. A deflection unit providing the basis for these curves 3 and 4 has a quality factor Q=76,000. As can be recognized from these curves, such a deflection unit changes its amplitude in a very substantial manner with a fixed control frequency or oscillation frequency even with small resonant frequency shifts which cannot be compensated by the available drive energies, i.e. e.g. very small temperature changes are enough to bring the deflection unit out of resonance. In this respect, the drive signal with the fixed drive frequency would no longer have an accelerating effect, but rather a high braking effect. The Lissajous projection processes or apparatus in accordance with the prior art having fixed frequencies can therefore not be used in conjunction with very high-quality resonators or deflection units since they do not allow any images sizes stable in time or any stable operation.

In the following, some numerical examples for the curves in accordance with FIG. 1 will be given, with the deflection unit having the curves 3 and 4 being a vacuum encapsulated biaxial micromirror scanner with Cardan suspension on the wafer plane, having axes orthogonal to one another and having a quality factor of Q=76,000. The low-quality micromirror scanner which is highly damped in comparison and which has the curves 1 and 2 and the quality factor Q=2,000 is operated at atmospheric pressure, but has substantially the same dimensions as the high-quality mirror. The highly damped scanner with Q=2,000 changes its oscillation phasing in comparison with the control signal by around 13 degrees with a frequency shift generated from the outside of ±0.5 Hz. A corresponding mirror delivers a phase shift of 154 degrees in underpressure operation and with a quality factor of Q=76,000 if a frequency shift of likewise ±0.5 Hz is induced from the outside. Related to the amplitude, such a frequency shift induced from the outside generates an amplitude reduction by 14 dB in the case of little damping, whereas in the damped case an amplitude change by only 0.06 dB occurs. Within the temperature range of −40° C. to +85° C. prescribed in the automotive sector for which operability of a component must be demonstrated, frequency shifts by some Hertz can be induced very easily in dependence on the mirror design and on the resonant frequency, which would result in even much larger phase and amplitude fluctuations.

When taking account of the above-named embodiments, the object additionally underlies the invention of providing a deflection unit for a projection apparatus for projecting Lissajous figures onto an observation field, said projection apparatus having small damping and being able to be used for a large temperature range in resonant operation of the deflection unit, with the energy consumption being smaller than with deflection devices in the prior art. It is furthermore the underlying object of the invention to provide a method for controlling a deflection device for a projection apparatus for projecting Lissajous figures, said projection apparatus allowing an operation of the deflection device in resonance, even if the resonant frequency of the deflection unit is changed by an external influence.

This object is satisfied by a deflection device which has a quality factor of larger than 3,000 and whose control apparatus has a feedback loop which is made to regulate the first and/or second control frequency/frequencies of the control signals in dependence on the measured phasing of the oscillations of the deflection unit so that the steep phase drop and/or the maximum amplitude of the oscillations of the deflection unit are kept in its resonant range, i.e. the phase and/or amplitude are kept substantially constant.

In a corresponding manner in the method for controlling a deflection device, the deflection device is selected so that it has a quality factor >3,000 and that the phasing of the oscillations of the deflection unit is measured about at least one deflection axis and the first and/or second control frequency is regulated in dependence on the measured phasing so that the phasing and the maximum amplitude of the oscillations of the deflection unit are kept in the resonant range.

High-quality scanners can be used which have a large total deflection angle by measuring the phasing and regulating the phase or the control frequencies such that an amplitude remaining the same is ensured in the resonant range. The drive or control frequencies and thus likewise the resonator oscillation frequencies represent the required freedoms to keep the phases and the amplitudes, preferably of both deflection axes, constant even with changing conditions of use or environment and thus to operate the deflection unit in a stable manner in resonance or close to resonance.

It likewise results from this that the Lissajous trajectory reached does not periodically repeat, i.e. a projection is used with a non-stationary Lissajous trajectory in which, the control frequencies or resonant frequencies are not fixed and therefore also do not have to be in an integer number relationship with one another. The control frequencies are changeable in accordance with the regulation device for the phase and amplitude stabilization.

Advantageous further developments and improvements are possible by the features set forth in the dependent claims.

The defaults for the permitted change range of the amplitude are determined by the properties of the deflection element and by the resolution of the observation field. The change range is, for example, preset in an axis as the reciprocal of the minimal resolution. On a definition using pixels, the amplitude should preferably change by less than one "pixel width". For example, the amplitude of the deflection element should change by less than $\frac{1}{480}$ (0.00283) and $\frac{1}{640}$ (0.00146) in the event of a minimal resolution of 480×640 pixels. The amplitude should preferably change by less than 1%, ever more preferably by less than 0.5%, even better by less than 0.3%.

In a particularly preferred embodiment the phase feedback loop is connected with a line density feedback loop which, dependent on a momentary line density of the Lissajous-trajectory substantially given by and calculable with the control frequencies, influences the resonance frequency of one or both driving axis in such a way that the line density does not leave a tolerance range. For the determination of the momentary line density, the control phasing, i.e. the starting point or the beginning of the oscillation has to be considered.

The micro mirror, respectively the deflection unit, typically driven electrostatically, is specifically influenceable regarding the resonance frequency in different ways, namely by specific temperature variations, by increasing or decreasing the drive voltage of the deflection axes and/or by actively changing the spring constant or stiffness. The temperature manipulation between others can be realized by IR-laser/radiation, as described later on. An increase of the drive voltage leads to a decrease of resonance frequency, since the increased drive forces act as a softening of the spring suspension.

The increase or decrease of the drive voltages may be realized by a superposition of a DC voltage additionally to the drive potentials, the amount of the displacement of the resonance frequency may be influenced by the height of the amplitude of the DC base.

The specific variation of the spring constant or stiffness may be realized by means of additional actuators, which directly act on the spring, e.g. torsion spring and which compress or expand it laterally.

Since together with the regulating of the line density the amplitude of the oscillation may vary slightly, beside of the phase feedback loop an amplitude feedback loop or regulating circuit may additionally provided. But the phase feedback loop has the highest priority and is configured to permanently react in a fast manner, while the line density feed back loop and, if applicable, the amplitude feedback loop are subordinated and react more slowly.

The line density feedback loop or regulating circuit may carry out its regulating or adjustment control by using different information. For example a table with stored disadvantageous repetition rates, i.e. ratios of control frequencies (f1/p, f2/q) may be stored. However, such a table is not always practicable because in some cases it may be extensive.

Additional a disadvantageous control circumstance has to be allowed, prior to identify it. Thus, another possibility is e.g.

senseful, in which the interval between the momentary repetition rate of the Lissajous figures and the next adjacent disadvantageous repetition rate is traced and a respective counter-regulating is carried out prior to the disadvantageous circumstance. A PID controller may monitor the interval.

It is to be preferred that the deflection unit has a quality factor >20,000, preferably >100,000. The required large optical scanning angles of more than 60 degrees can be achieved by the use of such high-quality resonator deflection units, for example using electrostatic deflection elements also with low drive voltages between 5 and 90 volts.

It is particularly advantageous that the deflection unit is vacuum encapsulated, preferably at the wafer level. The damping of the oscillations of the deflection unit is reduced by this measure, i.e. by the operation at reduced environmental pressure (p<1 mbar). In this respect, the quality factor can be directly influenced in a manufacturing process by a direct degrading of the vacuum by means of a gas refill process. This means: initially, a minimal pressure is realized in that a getter (e.g. titanium) enclosed in the mirror cavity is heated and binds as molecules chemically. If the vacuum is too good (the pressure too low or the quality factor undesirably high), an inert gas filling can be already carried out before the final encapsulation and heating with the next wafer. These gas molecules cannot be chemically bound by the getter and therefore continue to contribute to the damping and thus to the quality factor reduction. A direct vacuum improvement or quality factor increase can only be achieved by use of a getter having a higher getter capacity (better getter material, and large getter surface).

The control apparatus preferably has a measuring apparatus for the capacitive, optical, piezoresistive or piezoelectric measurement of the phasing. The phasing is in this respect determined from the amplitude information of the sinusoidal oscillations of the deflection element, with the zero crossing of the oscillation preferably being used.

In a preferred embodiment, a radiation source is provided for the temperature stabilization, with the control apparatus being made to switch on the radiation source for the irradiation of the deflection unit when the change in the first and/or second control frequency occurring for the regulation of the phasing and the amplitude is larger than a preset value. Temperature changes can thus be compensated.

It is advantageous that the line density feedback loop comprises at least one radiation source directed to the deflection unit, preferably an IR laser diode for the temperature influencing, is provided and that the control unit or this feedback loop is configured to control or regulate the power input caused by the radiation source in dependence on preset relationships of the control frequencies which determine the density of the Lissajous figures and which can be changed by the phase regulation. In this respect, the frequency shifts determining the relationships can be associated with preset and stored power inputs, preferably in the form of a curve or of a table or of a programmed functional connection or of a mathematical function which in the simplest case only has the control frequencies f1 and f2, but optionally also a series of parameters, e.g. f=fIR laser power (f1, f2, instantaneous projection laser power, instantaneous IR laser power, MEMS temperature . . . ). The regulation or control may also be carried out by means of a PID controller. Without the option of trimming the frequency relationships, i.e. the temperature treatment, an abundance of mirror chips would have to be sorted out because they have unfavorable resonant frequencies and deliver Lissajous trajectories with always only a small line density.

The goal of the temperature treatment is to ensure that parallel to the amplitude stability which is ensured by the phase regulation, simultaneously the line density of the Lissajous trajectory is optimum relative to the period of time of a part image (typical 1/60 seconds). In other words: The phase regulation keeps the mirror in resonance and stabilizes the amplitude. However, this regulation can have the result that unfavorable line densities are set. Without the additional influencing by the line density feedback loop e.g. by thermal regulation, there is otherwise no possibility to change the line density.

The temperature influencing with respect to the deflection unit by irradiation of the deflection unit does not have to be permanently in use, but rather complements the constantly present phase regulation, i.e. the phase regulation always has to be active, while the temperature influencing does not always have to be active. The temperature influencing could therefore have the character of a direct disturbance. It can, however, also be configured as a permanent regulation. This depends on the situation. Predictable fluctuations, in the resonant frequency, which are caused, for example, by the changing image content, can be permanently compensated by infrared laser bombardment, e.g. by means of a look-up table. The energy input into the mirror can already be recalculated on the writing or reading of the image memory and can be counteracted accordingly in a compensating manner by the IR source. The counteracting information can be taken from a look-up table. Superimposed events, such as shocks or vibrations or unpredictable temperature changes induced from the outside have to be compensated by additional thermal regulation in dependence on the breaking away of the control frequencies (and thus of the line density). A disturbance must therefore occur first so that a counteracting can be carried out by the feedback loop, unlike with the predictable influencing by the image content.

In a preferred embodiment, the deflection unit has at least one micromirror, with the total optical scanning angle indicating the deflection of the mirror being >30 degrees, preferably >40 degrees and even more preferably >60 degrees. In this respect, the micromirror can be a biaxial micromirror with Cardan suspension at torsion springs; however, single-axis mirrors arranged behind one another can also be used. The mirror used in the deflection apparatus will usually oscillate about two axes arranged orthogonally to one another. Angles differing from 90 degrees can, however, also be included between the scanning or deflection axes. The method in accordance with the invention or the deflection device in accordance with the invention are however, not necessarily restricted to two axes. A scanner having, for example, three or more torsion spring suspensions and/or flexible spring suspensions can thus also be used to realize a complex, densely packed Lissajous trajectory. The embodiments in accordance with the invention are also not restricted to a specific construction design of the MOMS scanner, e.g. to a Cardan suspension of the mirror or to a specific type of drive such as a type with electrode combs. It is always a requirement that the projection surface provided is sampled at sufficient speed and density by the projection beam. This could also be achieved by an MEMS actuator which does not achieve the beam deflection by reflection at a mirror, but by a refractive or diffractive element.

The deflection device in accordance with the invention for a projection apparatus for projecting an image onto an image field is preferably used; however, the application range is riot restricted to such a projection apparatus, but rather also includes scanning sensory image detection tasks such as in endoscopy or in scanning microscopy. In the projection apparatus for projecting an image onto an image field, a modulation unit for modulating the intensity of the light beam in dependence on the image to be projected and on the location of the light beam on the image field is additionally provided beside the deflection device. In a preferred embodiment, the radiation source for producing the light beam to be deflected includes laser diodes with multicolor emissions.

With the projection apparatus in accordance with the invention, image information can generally be transmitted at any time, i.e. picture elements can be transmitted at all points of the Lissajous trajectory. The images are thus preferably transmitted bidirectionally in each of the preferably two orthogonal scanning axes. The modulation unit is preferably controlled by a control unit which reads out the image data belonging to each mirror position, e.g. in the form of RGB picture element, intensities, from an associated image memory in a fixed time cycle which is preset in a digital module, e.g. in an FPGA or an ASIC. The modulation unit correspondingly controls the modulated RGB laser source for the read-out intensity value. The projection apparatus in accordance with the invention is not restricted to a fixed picture element projection rate so that it would equally be possible to realize a variable picture element projection rate which, for example, takes account of different scanning speeds and produces an equidistant picture element projection related to the scanning angle.

With the projection apparatus, one or more radiation sources are associated with the deflection unit for temperature stabilization and irradiates or irradiate the deflection unit in dependence on the intensity of the light beam determined by the image to be projected. In this manner, the temperature fluctuations in the deflection unit caused by the intensities of the light beam can be compensated.

Embodiments of the invention are shown in the drawing and will be explained in more detail in the following description. There are shown.

As already stated, amplitude responses and phase responses of highly damped 1, 2 micromirrors and of high-quality 3, 4 micromirrors for resonant frequencies between 17.15 kHz and 17.17 kHz are shown in FIG. 1. To show the effects of external influences, for example, of temperature changes, a resonant shift is shown by broken lines with the curve 3' and the curve 4', i.e. the frequency has shifted by a slight value toward lower frequencies. The frequency of the control signals, however, in accordance with the prior art, remains at the previous value, i.e. the control signals or the drive signals can have a braking effect on the mirror, i.e. it no longer oscillates with the resonant frequency. A phase regulation in accordance with FIG. 2 is therefore proposed in accordance with the invention.

Figure 2:
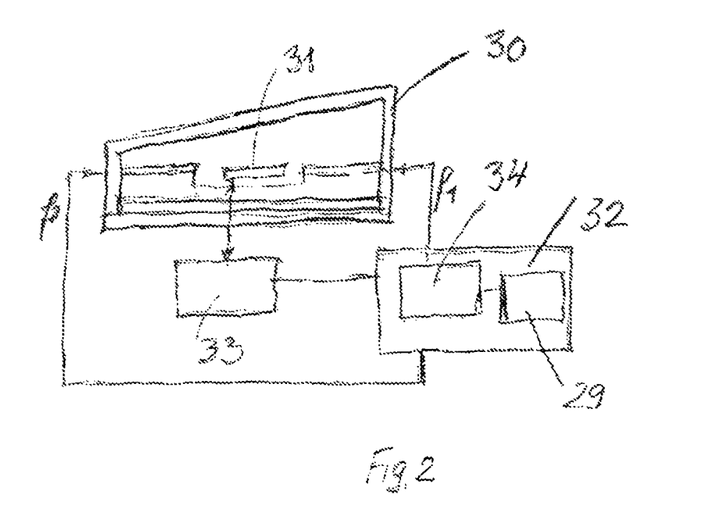
FIG. 2 a schematic representation of a deflection device in accordance with the invention with a feedback loop.

In FIG. 2, a deflection unit is shown schematically by 30 which includes a biaxial micromirror 31 with Cardan suspension as the deflection element 31. The deflection unit or the micromirror 31 whose drive is not shown in any more detail is driven by a control signal for each axis delivered, by a control apparatus 32 and having the frequencies f1 and f2 as control frequencies. The control frequencies f1, f2 should correspond to resonant frequencies of the mirror 31. So that the mirror 31 can also be adjusted in accordance with its resonant frequency on a change thereof, the control apparatus 32 has a phase feedback loop 34 which adjusts the phase and thus the control frequency of the control signals so that the mirror substantially operates in resonance. A measuring apparatus 33 which measures the sinusoidal deflection of the micromirror 31 is provided for detecting the phasing. Moreover a line density controller or feedback loop 29 may be provided, which corrects a disadvantageous line density of the Lissajous-trajectory, which may appear as a result of the phase control or adjustment, and keeps the line density within a given tolerance range. This is carried out by a specific detuning of one or both resonance frequencies.

Due to the high deflection speeds or scanning speeds, the instantaneous mirror position cannot in every case be measured discretely with sufficient precision and resolution at any desired point in time. The phasing, in particular the zero crossing of the sinusoidal oscillations, can, however, be determined very precisely from continuously measured amplitude information. This can be detected with the aid of optical or capacitive piezoresistive or piezoelectric sensors.

The position and the phasing of a resonant mirror can be detected optically with time resolution via a monitor laser beam and a position-sensitive 2D photodiode (PSD). Depending on the location of incidence of the laser beam deflected at the mirror, different photocurrents are picked up at the four exploring electrodes of the PSDs and are converted by a current-to-voltage converter and subsequent difference formation, sum formation and finally quotient formation (difference divided by sum) into a time-resolved XY position signal.

In the piezoresistive measuring method, the mechanically induced stress in the torsion springs produced during the torsion oscillation and depending on the deflection angle effects a resistance change in the sensor structures. This is as a rule evaluated by a Wheatstone bridge and delivers an output signal proportional to the torsion angle.

With piezoelectric sensors based e.g. on aluminum nitride layers or lead zirconate titanate layers, the twisting of the torsion spring generates a grid change which causes a charge shift. The spatial charge change can be measured as a voltage proportional to the tilt angle.

In capacitive evaluation processes, the capacitance between static and movable sensor electrode fingers dependent on the tilt angle and changeable in time is evaluated. A whole series of different evaluation methods are known from the literature. So-called carrier frequency processes are frequently used. For this purpose, a voltage modulated with radio frequency is applied to the sensor comb structures. The movement of the finger-shaped capacitances generates a capacitive current whose signal shape represents an amplitude modulation of the carrier signal. In amplitude modulation, the information is contained via the mirror movement and can be extracted by multiplication (mixing) and filtering.

Figure 7:
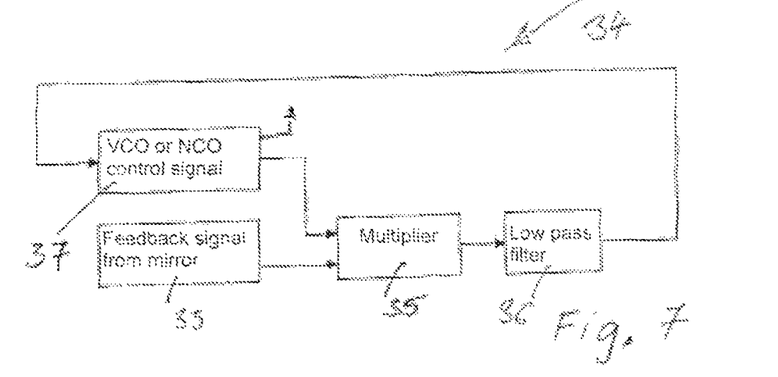
FIG. 7 a block diagram of a phase regulation loop.

In FIG. 7, a phase feedback loop 34 is shown as can be used in the control apparatus 32.

As a rule, all the above-described measuring processes suffer to more or less a large extent from noise and interference, which makes impossible a direct instantaneous utilization for projection location determination and pixel addressing in accordance with the resolution required for the image projection (will be further explained in connection with FIG. 6). A lock-in amplifier having a multiplier 35 and a low-pass filter 36 is e.g. used in the phase feedback loop 34 to determine a precise phase difference signal. Furthermore, the feedback loop 34 has a voltage-controlled (VCO) or numerically controlled oscillator (NCO) 37 which is connected after the low pass filter 36 and is connected to the multiplier 35. The multiplier 35 thus receives the signal from the measuring apparatus 33, i.e. the feedback signal from the mirror 31 and the output signal from the oscillator 37.

In order not to regulate to a phase difference of zero, but rather to any desired settable value, a phase shifter has to be provided between the output of the oscillator which presets the reference signal for the feedback loop and the multiplier 35, which was omitted for clarity. The reference oscillator signal (here the VCO signal before multiplication) is delayed with the aid of the phase shifter so that also a desired value different from zero can be preset for the phase difference. To keep the mirror in resonance, this phase regulator could be set so that a phase difference of, for example, 90 degrees results between the control signal and the mirror oscillation occur when taking account of all delays in the signal processing.

The difference between the mirror phase angle and the phase angle of the control signal can be determined sufficiently precisely with the aid of the lock-in amplifier in that the control signal (reference oscillator) is first multiplied by the feedback signal gained capacitively, for example, and is subsequently subjected to low pass filtering. A DC signal is obtained at the output in accordance with trigonometric relationships and has an amplitude proportional to the phase difference (mirror phase to reference oscillator). If this output signal of the lock-in amplifier is supplied to the input of the oscillator 37 via an amplifier (gain) not shown, a PLL feedback loop (phase-locked loop) is obtained. A constant Phase difference between the mirror and the control signal can be realized using this PLL. In other words, the PLL can provide that the mirror is always in resonance or in defined proximity to the resonance, i.e. the control frequencies f1, f2 agree with the resonant frequencies of the mirror 31.

This means that the frequencies f1, f2 of the control signals are not permanently constant, but can rather change in favor of the phase stabilization and amplitude stabilization. Furthermore, the resonant frequencies of horizontal and vertical beam deflection have no fixed integer-number ratio. The Lissajous trajectory is thereby not stationary and there is generally no fixed repetition rate of the Lissajous trajectory. With an image projection apparatus, this would mean that there is no fixed foreseeable order of the image memory readout process since the sampling of the projection surface is not constant.

The time variation of the Lissajous trajectory results in the favorable circumstance that the unwanted speckle patterns which occur in laser projections are perceptibly reduced because it is not always the same scattering centers which are impacted on the projection surface, but rather different scattering centers. However, this has the consequence that the speckle patterns also vary and are averaged in the eye by superimposition and time integration. This is an advantage with respect to all laser projection processes having stationary trajectories.

The phase feedback loop 34 shown in FIG. 2 is only indicated schematically for both axes; a phase feedback loop can be provided for each oscillation axis. Even if phase feedback loops for stabilization of a phase difference between the excitation signal and the corresponding resonator oscillation exist in each oscillation axis, the oscillations of the two axes thus never form a stable phase relationship with one another due to the variable oscillation (oscillator) frequency.

Figure 3:
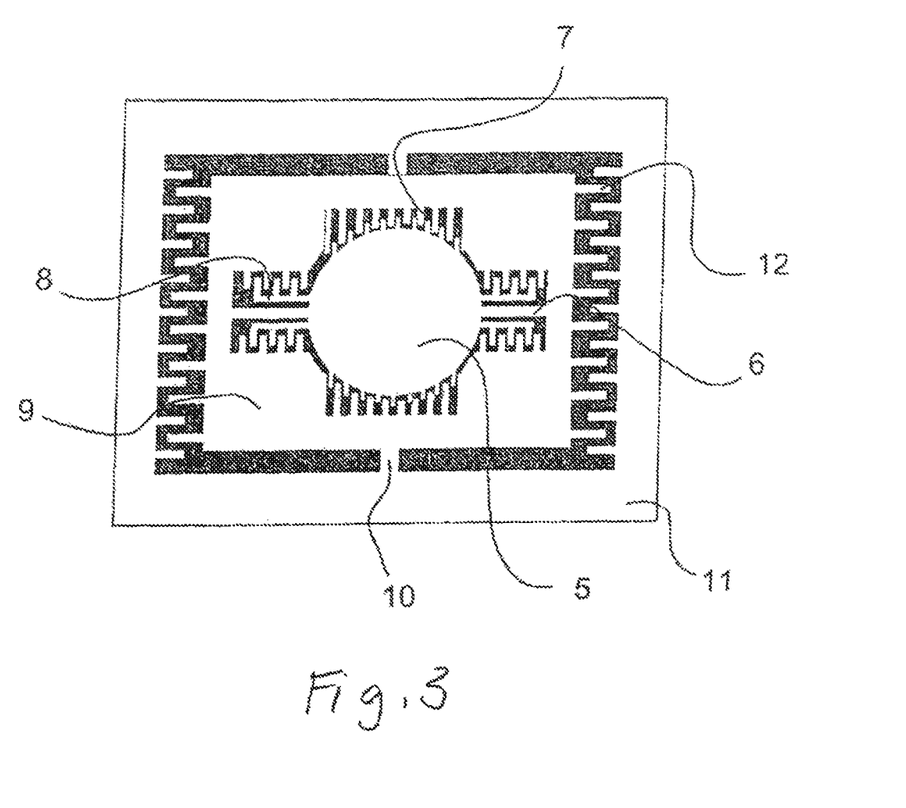
FIG. 3 a plan view of a biaxial micromirror with Cardan suspension and comb drives.

A biaxial micromirror 5 having Cardan suspension such as can be used in FIG. 3 is shown in FIG. 3. Electrostatic comb drives 7 remote from the axis and cam drives 8 close to the axis are shown which can also be used as sensor electrodes. The mirror plate 5 is suspended via torsion springs 6 in a movable frame 9 which is in turn suspended by torsion springs 10 in a fixed chip frame 11. The frame 9 can be set into resonance by electrostatic comb drives 12, with comb electrodes close to the axis for drive or sensor purposes of the movable frame 9 being omitted for clarity.

Figure 6:
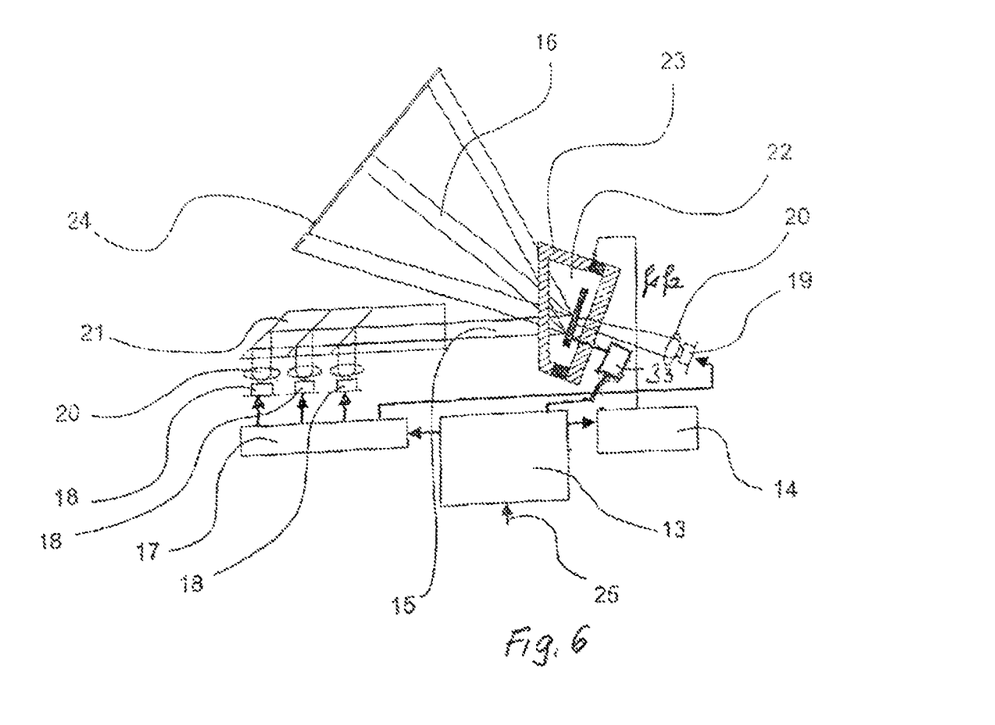
FIG. 6 a schematic design of a projection apparatus in accordance with the invention with a deflection unit in accordance with the invention.

An arrangement of a Lissajous laser projection apparatus in accordance with the invention is shown in FIG. 6. This projection apparatus has a deflection device in accordance with FIG. 2, with the vacuum-encapsulated, biaxial MEMS mirror scanner here being designated by the reference numeral 22. Red, green and blue laser sources 18 whose light, or radiation is parallelized by collimators 20 and is shaped by a beam combining system 21 into a coaxial beam 15 are provided as the radiation source. This beam 15 is directed to the mirror by the oblique glass cover 23 of the MEMS mirror scanner 22. The deflected laser beam 16 biaxially illuminates a projection surface 24. Digital image data are delivery via an input 25 to a digital signal processing and control unit 13 in which control pulses corresponding to the image data are forwarded to an analog control unit 17 with whose aid the emission of the laser sources 18 is controlled. The measuring apparatus 33 for measuring the deflection of the mirror of the deflection unit 23 which is connected to the signal processing and control unit 13 is indicated by 33. Said signal processing and control unit also controls an analog voltage amplifier 14. It forms the control apparatus in accordance with FIG. 2 with parts of the signal processing and control unit 13, with here only one control signal line being shown for both deflection axes having the frequencies f1, f2. The signal processing and control unit 13 in turn includes two feedback loops 34 in accordance with FIG. 7.

Furthermore, a fourth laser source 19 is provided which is preferably a near infrared laser source, e.g. a laser diode matched with respect to the wave-length to the absorption maximum of silicon, which can be used to keep constant the fluctuations of the laser power incident onto the mirror, said fluctuations caused by the image data. In the arrangement shown, the laser source 19 radiates onto the non-mirror coated rear side of the MEMS mirror scanner 22. The frequency of one of the two scanner axes or also of both axes simultaneously can hereby be influenced efficiently with a very low laser power.

The access of the image data in the memory of the signal processing and control unit 13 depending on the mirror movement and the control of the laser sources 18 following thereupon can take place according to the following scheme. Precise phase information can be obtained using the feedback signal acquired optically, piezoresistively, piezoelectrically or capacitively. Since this feedback signal, as already described in connection with FIG. 7, generally has specific interference portions and distortions, this feedback signal is further processed, preferably in the already mentioned lock-in amplifier, with this further processing being contained in the signal processing and control unit 13. A signal is thus obtained at the output of the lock-in amplifier which is proportional to the phase difference between the reference oscillator 37 (VCO, see FIG. 7) and the feedback signal. The oscillation shape of the mirror is synthetically mapped with respect to frequency and phase under the condition that the mirror oscillates in a sinusoidal manner. Picture element coordinates for both axes can now be determined and associated memory contents can now be read out, e.g. based on a fixed time clock (pixel clock), with respect to this mirror position signal. All the digital procedures and components are part of the signal processing and control unit 13. After the reading out of the memory contents (intensity values) the laser source drivers 17 can be correspondingly controlled on the basis of these contents and picture elements can be transmitted via the control of the laser sources 18.

The picture element projection does not provide any fixed, unchanging fixed-position picture element, pattern, but rather a projection differing from this pattern, which is not intended to mean that the image is distorted, but rather that theoretically interpolated picture elements can also be set at the points between two pattern points. When a picture element is set is thus dependent on the pixel clock and not on the instantaneous location. The location only determines the pixel intensity to be transmitted and read out of the image memory. Preferably, not only one image memory cell is read out and interpolated for the projection of a picture element, but rather all the directly adjacent pixels of the instantaneous location position are read out and interpolated in a focused manner. There is no time interval during which the pixel clock cannot trigger any image data projection.

Figure 4:
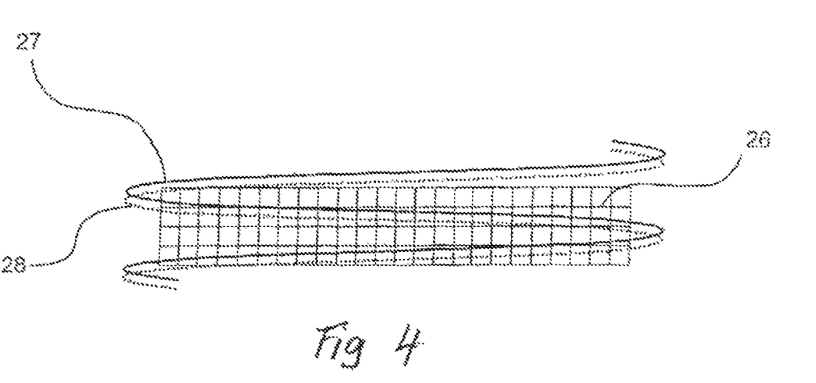
FIG. 4 a section of a non-closed Lissajous trajectory in which the ratio of the oscillation frequencies in the two axes is less than the resolution of the pixel pattern.
Figure 5:
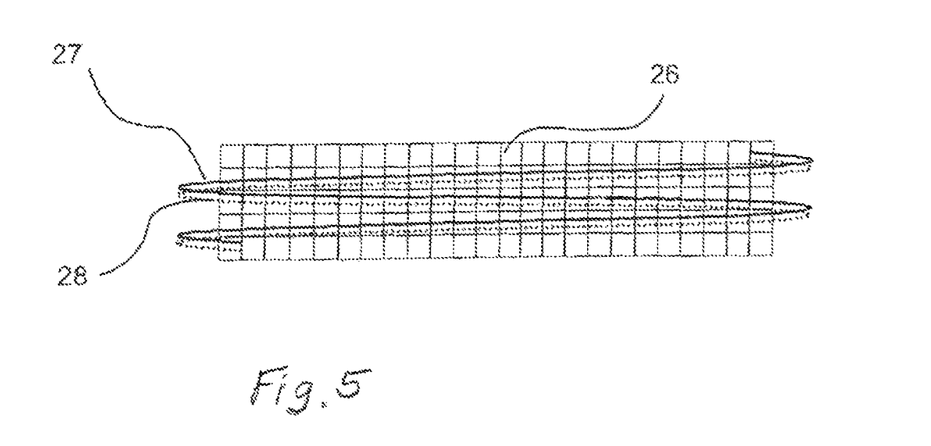
FIG. 5 a representation in accordance with FIG. 4 in which the ratio of the oscillation frequencies is approximately identical to the resolution of the pixel pattern.

Sections of a non-closed, i.e. a non-fixed position, Lissajous trajectory 27 are shown in FIG. 4 and FIG. 5. In that in accordance with FIG. 4, the variable sampling frequencies or scanning frequencies which correspond to the resonant frequencies of the mirror form a relationship with one another which is smaller than the resolution of the pixel pattern. In the second passage, the trajectory 28 no longer passes through the same orbit as previously the trajectory 27 due to the non-integer number relationship of these scanning frequencies and due to the variable scanning frequencies. A stable image projection is also possible when slightly different (interlaced) trajectories are produced in each scanning procedure. It is important that the row density in each case reached after 1/60 seconds covers the image row resolution in a sufficient manner.

In FIG. 5, a corresponding non-closed Lissajous trajectory 27 is shown, as in FIG. 4, in which the relationship of the variable scanning frequencies is approximately identical to the resolution of a pixel pattern 26. The same orbit as previously with the trajectory 27 is also no longer swept over here on the second passage.

Whereas in accordance with FIG. 4, a selection of the scanning frequencies f1 and f2 takes place so that their quotient is smaller than the row number of the image to be projected and only a stringing together of a plurality of interlaced images covers the total image, in this representation in accordance with FIG. 5, the frequency relationship is directly adapted to the row number so that each row contained in the image is already "sampled" or is "read", "written" or "projected" in the first passage. In the second passage, each row is likewise again read and projected, but, as illustrated, the trajectory extends in a slightly offset manner, which does not, however, appear as disturbing in the image.

The phase regulation brings along the fact, as mentioned above, that the projection process is based on non-fixed position Lissajous trajectories, with the control or oscillation frequencies f1 and f2 of the two mirror axes being designed variably. In this respect, "variable" is to be understood such that it is changeable within an interval, which is given by the possible shift of the resonant frequency of the deflection unit, e.g. as a result of temperature fluctuations. It can be caused by the regulation that unfavorable line densities of the Lissajous figures are adopted which are influenced by the then current frequencies f1 and f2. It is thus by all means possible that an adjustment of one of the two frequencies by only 0.01 Hz decides whether the projected image comprises 10 lines or a few hundred lines. Favorable and unfavorably frequency intervals and frequency relationships can thus be defined. If the two frequencies f1 and f2 are very close to one another, e.g. 24,000 Hz and 24,057 Hz, there are relatively large favorable frequencies. If the frequencies f1 and f2 are, however, far apart from one another, for instance 500 Hz and 24,000 Hz, the intervals of favorable frequencies are then narrower. In every case, such favorable and unfavorable regions can be defined in advance in dependence on the desired resolution and limit values for the frequencies can be derived therefrom.

The Lissajous curve is, as is known, periodic exactly when $f_1/f_2=p/q$ is a rational number, where p and q are integer numbers and do not have any common divisor. The repetition frequency F of the Lissajous curve is therefore:

$$F=f_1/p=f_2/q$$

To obtain a uniform illumination (high line density), it is the goal to keep F as small as possible. With a preset $f_2$, this means that q should be an integer number which is as large as possible. With respect to the selection of the frequency relationship $f_1/f_2$, it is therefore a rational number p/q with a denominator which is as large as Possible. An F which is as small as possible means that F should be smaller than the desired image refresh rate $f_B$.

In the preceding paragraph fixed-position Lissajous trajectories have been looked at. Due to the phase regulation proposed in the invention, it is not necessary to work with fixed frequencies $f_1$ and $f_2$. The preceding considerations are nevertheless relevant to the interpretation of the frequencies $f_1$ and $f_2$ of the biaxially resonant scanning mirrors.

When $f_1/f_2=p/q$ is rational, q (approximately) indicates the number of nodes of the Lissajous figure in the x direction or y direction. 2q lines which intersect are required for q nodes. The number of pixels which can be resolved is therefore q or 2q depending on whether lines or nodes are counted.

When the frequencies and thus their quotient fluctuate by 1%=1/100, there is a most unfavorable rational number with a small denominator q in every fluctuation interval; q is at best 100, usually much worse, typically between 10 and 20.

It is therefore a part of this invention to avoid the unfavorable frequency relationships. The unfavorable frequency relationships can be avoided by the line density controller 29, in another embodiment by thermoregulatory counter-control, i.e. the deflection unit can, for example, be irradiated by the NIR laser source 19 so that the frequency f1 and/or f2 is/are changed. One or more further radiation sources can naturally also be provided.

To be able to carry out the thermal control or thermal regulation directly, it must be determined for every deflection unit after its manufacture which relationships of the control frequencies result in an unacceptable line density and are to be avoided. For this purpose, these frequency relationships are stored in a memory of the control apparatus. In addition, the frequency differences or frequency shifts are stored in the form of curves or look-up tables in dependence on the output power of the radiation source or sources.

The control apparatus or the line density controller or feedback loop then monitors, parallel to the image projection or Lissajous projection, the frequency relationships and/or the momentary line density and, when unfavorable relationships occur due to the phase regulation, switches the radiation source on or off.

If e.g. the NIR laser source 19 or a corresponding laser source is selected, a certain infrared laser power can be applied as a base amount from the start, whereby the influencing of can be carried out in both directions, namely once by reduction of the IR laser tower and once by increasing the IR laser power. See point 17

The NIR laser source 19 can also be used to compensate changes in the resonator frequencies, i.e. in the oscillation frequencies, of the MEMS mirror scanner 22 by, for example, changing the environmental temperatures. For this purpose, a predefined frequency range can be preset for the control frequencies.

In FIG. 6, the laser source 19 irradiates the rear side of the mirror; naturally, a different incidence site of the scanner 22 can also be selected to achieve a dominant influencing of either the mirror resonant frequency or of the resonant frequency of the outer movable frame or also of both. By application of two laser spots, once on the mirror, once on the outer movable frame and based on two laser sources controllable independently of one another, a separate simultaneous influencing of the resonant frequencies of both axes can be achieved.

Figure 8:
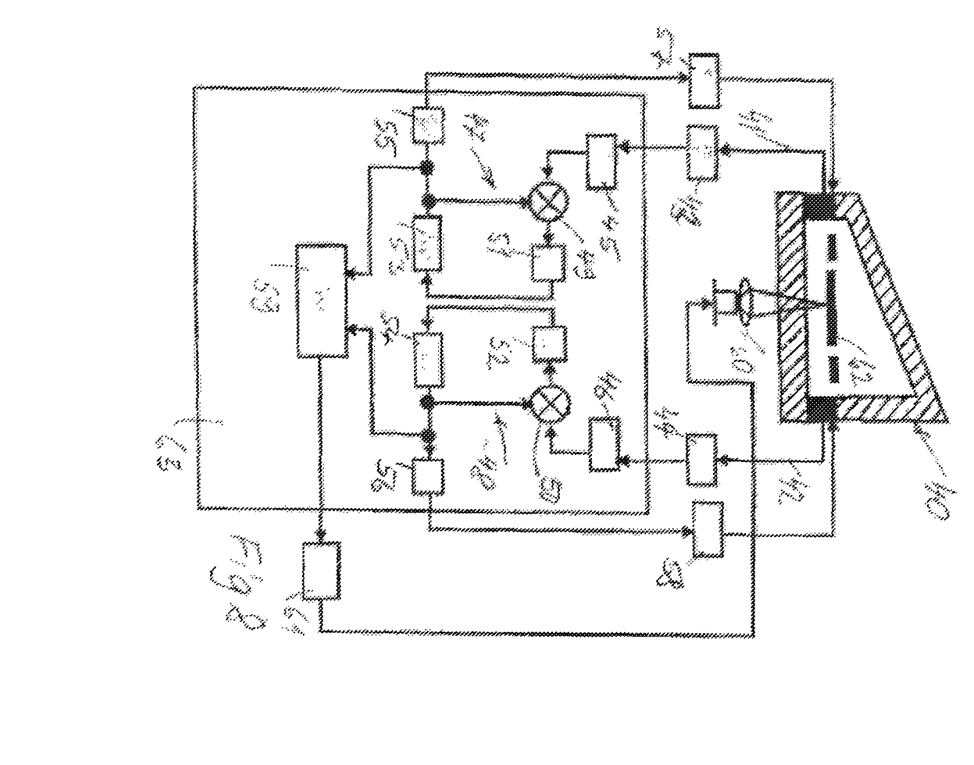
FIG. 8 a detailed circuit diagram of the control apparatus for the deflection unit.

In FIG. 8, the deflection apparatus in accordance with FIG. 2 is shown again more accurately with the phase feedback loop 34 of FIG. 7, with new reference symbols being selected in part for reasons of clarity even though the same elements as in these Figures are used in part. 40 designates the already described vacuum encapsulated 2D scanner or the deflection unit. A measured signal 41, 42 is supplied for each deflection axis as a capacitive feedback to respective current-voltage converters 43, 44 which are connected to A/D converters 45, 46 which convert the analog signals into digital feedback signals. The phase feedback loops 47, 48 which each comprise the digital multipliers 49, 50, the digital low pass filters 51, 52 and the oscillators (NCO) 53, 54 are connected after the AID converters 45, 46. The phase signals are supplied via D/A converters 55, 56 and analog voltage amplifiers 57, 58 as control signals to the drives of the deflection unit 40.

The respective output signals of the oscillators 53, 54, which correspond to the control signals having the frequencies f1 and f2, are supplied to a unit 59 for digital monitoring of the frequency relationship f1/f2 and for digital control of an IR laser source 60. The disadvantageous frequency relationships for the density of the Lissajous lines are e.g. stored in this unit 59. If such a disadvantageous frequency relationship were to occur due to the phase regulation, the unit 59 controls the laser source 60 to irradiate the mirror 62 via an analog IR laser source driver 61. In this respect, the required power input which is e.g. determined via the time of the control of the laser source 60 is stored in dependence on the frequency shift in the unit 59 or is saved as a functional relationship. It is thus possible to counteract the unfavorable frequency relationship from the start.

The described essential components are combined to a control unit 63 as an FPGA or ASIC forming the control apparatus.

As was already mentioned above, a particularly advantageous embodiment of the deflection device uses a biaxial MEMS mirror scanner whose resonant frequencies of the two orthogonal scanning axes are above 16 kHz, with them differing from one another by the embodiment of the design only by less, than 10%. The advantages of such an arrangement are found in the particular suitability for the automotive sector in which it is a question of implementing a particularly shock-insensitive and vibration-insensitive projection system simultaneously having very high resolution, for instance for instrument displays, dashboard displays or passenger entertainment. The shock insensitivity is achieved by the two very high resonant frequencies which are close to one another. Unlike with Lissajous scanners in accordance with the prior art having a very large frequency relationship of fast to slow axes, in the present invention no parasitic modes are as a rule present between the two modes of use. It is possible due to the two relatively high-lying resonant frequencies which only differ slightly simultaneously to implement a broad frequency space in that the two scanning frequencies may change without Lissajous trajectories with a small line density being able to result.

The invention claimed is:

1. A deflection device for a projection apparatus for projecting one or more Lissajous figures onto an observation field, which is configured to deflect a light beam about at least one first and one second deflection axes for generating one or more Lissajous figures, the deflection device comprising:
   a deflection unit, configured for producing oscillations about the deflection axes; and
   a control apparatus, configured for producing one or more control signals for the deflection unit, the control signals having a first and second control frequencies that substantially correspond to resonant frequencies of the deflection unit; and
   wherein the deflection unit has a quality factor of >3,000; and
   wherein the control apparatus includes a first feedback loop that is configured to regulate the first and/or second control frequencies in dependence on a measured phasing of the oscillations of the deflection unit so that a maximum amplitude of the oscillations remains in a resonant range of the deflection unit, such that the control frequencies do not have a substantially fixed integer number ratio.

2. The deflection device in accordance with claim 1, wherein the first feedback loop is configured to regulate the control frequencies so that an amplitude of the oscillations about the respective deflection axis changes by less than 1 divided by a minimal resolution of pixels.

3. The deflection device in accordance with claim 1, wherein the control apparatus comprises a second feedback loop that is configured to influence the resonant frequencies of the deflection unit in the first and/or second deflection axes dependent on a line density given by the control frequencies in such a way that the line density is within a specified tolerance range.

4. The deflection device in accordance with claim 3, wherein the second feedback loop is configured to influence the resonant frequencies of the deflection unit in the first and/or second deflection axes by at least one of varying of a given control voltage, detuning a spring constant, and/or temperature influencing the deflection unit.

5. The deflection device in accordance with claim 1, wherein the first feedback loop is configured to regulate the control frequencies so that an amplitude of the oscillations of the respective deflection axis changes by less than 1%.

6. The deflection device in accordance with claim 1, wherein the deflection unit is vacuum encapsulated.

7. The deflection device in accordance with claim 1, wherein the control apparatus includes a measuring apparatus configured for at least one of capacitive, optical, piezoresistive, or piezoelectric measurement of a phasing.

8. The deflection device in accordance with claim 1, wherein at least one radiation source directed to the deflection unit is provided for temperature compensation and the control apparatus is configured to control the radiation source in an intensity modulated manner when a change of the first and/or second control frequencies taking place for a regulation of a phasing and an amplitude of the oscillations is larger than a preset value.

9. The deflection device in accordance with claim 1, wherein a second feedback loop comprises at least one radiation source directed to the deflection unit and configured for temperature influencing and the control apparatus is configured to control a power input caused by the radiation source in dependence on one or more present relationships of the control frequencies that determine a density of the one or more Lissajous figures and that are changeable by a phase regulation.

10. The deflection device in accordance with claim 9, wherein at least one of: (1) the control apparatus or the second feedback loop has a memory in which an association table between a frequency shift and the temperature influencing is stored; or (2) the control apparatus or the second feedback loop is programmable to control the power input using a mathematical function.

11. The deflection device in accordance with claim 1, wherein the deflection unit has at least one micromirror, with a total optical deflection angle of the mirror being >30 degrees.

12. The deflection device in accordance with claim 11, in combination with a projection apparatus, wherein at least one radiation source configured to be intensity modulated for irradiating the deflection unit and the control apparatus are made to control a radiation intensity of the at least one radiation source in dependence on the instantaneous radiation intensity of the projection radiation source.

13. The deflection device in accordance with claim 1, in combination with a projection apparatus for projecting an image onto an image field, the deflection device having a projection radiation source and a modulation unit for modulating an intensity of the light beam of the projection radiation source in dependence on the image to be projected and on a location of the light beam on the image field.

14. The deflection device in accordance with claim 13, in combination with the projection apparatus, wherein the projection radiation source for producing the light beam to be deflected includes at least one laser diode with multicolor emission.

15. A method for controlling a deflection unit for a projection apparatus for projecting one or more Lissajous figures onto an observation field, the method comprising:

deflecting a light beam about at least one first and one second deflection axes for producing the one or more Lissajous figures;

producing oscillations about the deflection axes controlled by a first and a second control frequencies which are selected so that the deflection unit substantially works in resonance, providing the deflection unit with a quality factor of >3,000;

measuring a phasing of the oscillations of the deflection unit about at least one deflection axis; and regulating the phasing by changing the first and/or second control frequencies so that an amplitude of the oscillations is kept in a resonant range of the deflection unit, such that the control frequencies for generating time varying Lissajous-trajectories do not have a substantially fixed integer number ratio.

16. The method in accordance with claim 15, wherein the control frequencies are regulated so that the amplitude of the oscillations of the respective deflection axis changes by less than a reciprocal value of a minimal resolution of the image of the Lissajous figures; and/or the amplitude of the oscillations of the respective deflection axis changes by less than 1%.

17. The method in accordance with claim 15, wherein resonant frequencies of the deflection unit in the first and/or second deflection axes are regulated dependent on a line density given by the control frequencies in such a way that the line density is within a specified tolerance range.

18. The method in accordance with claim 15, wherein the deflection unit is kept at underpressure.

19. The method in accordance with claim 15, wherein the phasing is measured at least one of optically, capacitively, piezo-resistively, or piezoelectrically.

20. The method in accordance with claim 15, wherein the deflection unit is irradiated with electromagnetic radiation by a radiation source, with a power input being controlled in dependence on a frequency shift of at least one of the control frequencies occurring due to the phasing regulation.

21. The method in accordance with claim 20, wherein the power input is controlled in dependence on one or more preset relationships of the control frequencies determining a density of the one or more Lissajous figures, with the frequency shift determining the relationships being associated with preset power inputs.

22. The method in accordance with claim 20, wherein the power input is carried out when the change in the first and/or second control frequencies caused due to the phasing regulation exceeds a preset value.

* * * * *